United States Patent [19]

Nishimori et al.

[11] Patent Number: 5,031,714
[45] Date of Patent: Jul. 16, 1991

[54] STEERING GEAR RATIO CHANGING APPARATUS

[75] Inventors: Masayoshi Nishimori, Okazaki; Hiroshi Yoshida, Toyokawa; Tadao Tanaka; Hiroyuki Masuda, both of Okazaki, all of Japan

[73] Assignees: Mitsubishi Jidosha Kabushiki Kaisha; Mitsubishi Jidosha Engineering Kabushiki Kaisha, both of Tokyo, Japan

[21] Appl. No.: 475,122

[22] Filed: Feb. 5, 1990

[30] Foreign Application Priority Data

Feb. 10, 1989 [JP] Japan .................................. 1-31306

[51] Int. Cl.⁵ .............................................. B62D 5/08
[52] U.S. Cl. ..................................... 180/132; 180/140; 180/141; 91/375 A
[58] Field of Search ................... 180/140–143, 180/132; 91/375 R, 375 A

[56] References Cited

U.S. PATENT DOCUMENTS

| 3,657,967 | 4/1972 | Suzuki | 91/375 A |
| 3,772,962 | 11/1973 | Suzuki | 91/375 A |
| 3,930,554 | 1/1976 | Ward | 91/375 A |
| 4,481,866 | 11/1984 | Matouka | 91/375 A |
| 4,561,516 | 12/1985 | Bishop et al. | 180/142 |
| 4,715,464 | 12/1987 | Nakamura et al. | 180/142 |
| 4,765,428 | 8/1988 | Kawakami et al. | 180/143 |

FOREIGN PATENT DOCUMENTS 0302267 2/1989 European Pat. Off. .
1292445 10/1972 United Kingdom .

Primary Examiner—Charles A. Marmor
Assistant Examiner—Victor E. Johnson
Attorney, Agent, or Firm—Hedman, Gibson, Costigan & Hoare

[57] ABSTRACT

A steering gear ratio changing apparatus includes a first and second steering shafts arranged to be coaxial with each other. The first steering shaft is coupled to a steering wheel of a vehicle and rotatable integral therewith. The second steering shaft is coupled to a steering gear mechanism and arranged to be rotatable. First pawls are formed on one end of the first steering shaft and arranged at equal intervals along the circumferential direction of the shaft. Second pawls are formed on one end of the second steering shaft, which oppose the end of the first steering shaft, and are arranged at equal intervals along the circumferential direction of the shaft. The first and second steering shafts are coupled with each other by a torsion bar and held thereby so that the first and second pawls are engage with one another with a gap between any two adjacent first and second pawls. The width of the gaps is adjusted by actuators so as to cause a relative rotation between the first and second steering shafts.

15 Claims, 13 Drawing Sheets

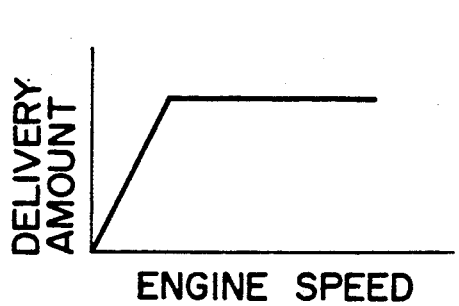
F I G. 11
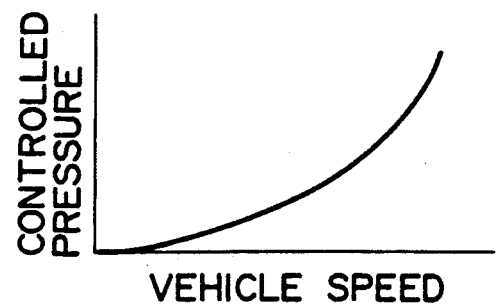
F I G. 12
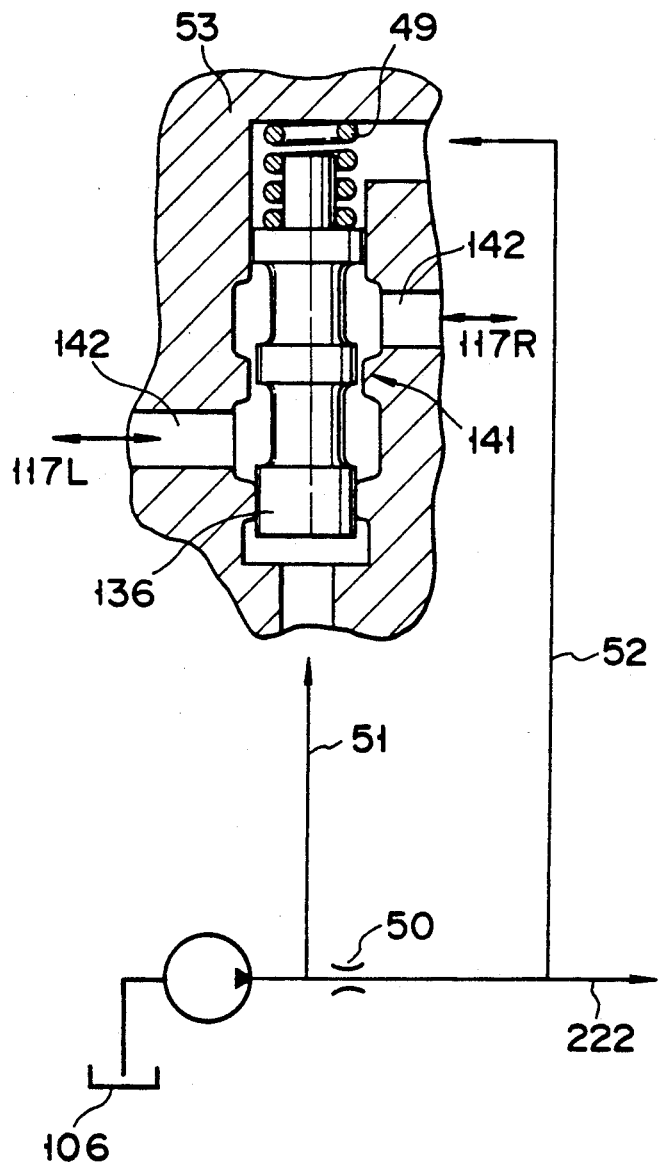
F I G. 13

STEERING GEAR RATIO CHANGING APPARATUS

BACKGROUND OF THE INVENTION

1. Field of the Invention

The present invention relates to an improvement in a steering gear ratio changing apparatus for changing the turning angle of vehicle wheels in accordance with the analog of rotation of a steering wheel.

An apparatus disclosed in, e.g., Published Examined Japanese Patent Application No. 54-34212 (U.S. Pat. No. 3,831,701) is known as a conventional steering gear ratio changing apparatus.

This apparatus is designed such that a gear ratio changing mechanism of a planetary gear system is arranged in the middle portion of a steering shaft, and a steering gear ratio is changed by the operation of the gear ratio changing mechanism. More specifically, this gear ratio changing mechanism is designed such that input and output shafts are respectively coupled to the sun gears of the first and second planetary gear mechanisms whose planetary gear carriers are coupled to each other. In this arrangement, a differential input is supplied from an actuator to the ring gear of the second planetary gear mechanism so as to control the rotating amount of the output shaft in response to the rotating amount of the input shaft.

In the conventional steering gear ratio changing apparatus, however, since the gear ratio changing mechanism of the planetary gear system is used, play of the steering wheel tends to be produced due to the backlash of the gears.

If the changing apparatus is combined with a power steering unit, steering torque-oil pressure characteristics tend to exhibit excessive hysteresis (a great difference appears in the hydraulic pressure generated by the power steering unit between the turning and returning sides of the steering wheel) due to friction between gears upon rotation.

Another problem of the changing apparatus is that its structure is complicated and large in size. In addition, the strength of each gear against an excessive input from the steering wheel must be ensured, and the ring gear must be actuated by the actuator. For these reasons, it is very difficult to reduce the apparatus in size. Hence, a large space is required to mount the apparatus in a vehicle.

SUMMARY OF THE INVENTION

The present invention has been made in consideration of the above-described conventional problems, and has as its object to provide a compact steering gear ratio changing apparatus having high operation reliability.

In order to achieve the above object, according to an apparatus of the present invention, a first steering shaft is coupled to a steering wheel and a second steering shaft is coupled to a steering gear box. These steering shafts are coupled to each other through a torsion bar, and held by the bar so that gaps set apart in the circumferential direction of the torsion bar are defined between the shafts. An actuator for forcibly causing relative rotational displacement between the steering shafts by adjusting the width of gaps is arranged between the steering shafts.

According to the changing apparatus having the above-described arrangement, since the first and second steering shafts coupled to each other through the torsion bar are engaged with each other with the gaps set apart in the circumferential direction of the bar, when the width of gaps are forcibly changed, the turning angle of the vehicle wheels with respect to the turning angle (the angle of rotation) of the steering wheel is changed in accordance with changes in width of the gaps. Adjustment of the width of gaps is performed by an operation of the actuator. While the actuator is not operated, an input from the first steering shaft is transmitted, as it is, to the second steering shaft through the torsion bar without generating a relative rotation between the first and second shafts 12 and 13. However, when the actuator is operated to forcibly twist the torsion bar and change the width of the gaps, a difference in rotational angle between the first and second steering shafts appears. As a result, the steering gear ratio is changed.

In comparison with the conventional apparatus using the planetary gear mechanism, the structure of the present invention can be simplified and made compact. In addition, the backlash of gears and their rotational resistance pose no problem, unlike the conventional apparatus.

Even if the torsion bar is broken, since the first and second steering shafts are engaged with each other to transmit a steering input between, a failsafe function can be ensured without any special mechanism.

According to a preferred embodiment of the present invention, the actuator comprises a first plunger, arranged on one of the steering shafts at an engaging portion thereof, for urging the other steering shaft in the circumferential direction to cause relative rotation between the steering shafts, and a second plunger, arranged on one or the other of the steering shafts at an engaging portion thereof, for urging the other or one of the steering shafts in the circumferential direction to cause relative rotation between the steering shafts in an opposite direction to that of the first plunger. Each plunger is arranged in a pressure chamber formed in the corresponding steering shaft, and the protrusion amount of the plunger is controlled in accordance with the state of hydraulic pressure introduced into the pressure chamber, thereby efficiently decreasing the apparatus in size.

According to another preferred embodiment of the present invention, a control value for a power steering unit is arranged between the second steering shaft and the gear box, and a torsion bar for the valve which is coupled between the second steering shaft and the gear box is arranged in the control valve. The rigidity of the torsion bar arranged between the first and second steering shafts is set to be larger than that of the torsion bar for the valve. With this arrangement, a steering force input to the steering wheel can be efficiently input to the control valve for the power steering unit, thus ensuring compatibility of the apparatus with the power steering unit without problems.

According to still another preferred embodiment of the present invention, a control means is arranged to control an operation of the actuator so as to increase the turning angle of the vehicle wheels in accordance with the change rate of a turning state of the steering wheel. Since this control means is designed to control an operation of the actuator so as to increase the turning angle of the vehicle wheels in accordance with the change rate of hydraulic pressure generated by the power steering unit, the yaw response of the vehicle during a quick steering operation is improved, and the above-described control can be realized by only employing hydraulic control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 17 show a steering gear ratio changing apparatus according to a first embodiment of the present invention, in which:

FIG. 1 is a view showing a schematic arrangement of a four-wheel steering system including the steering gear ratio changing apparatus according to the first embodiment of the present invention;

FIG. 2 is a circuit diagram of a hydraulic circuit of the steering system;

FIG. 3 is a longitudinal sectional view of the apparatus;

FIG. 4 is a partially cutaway perspective view of the apparatus;

FIG. 5 is an enlarged sectional view showing a main part of the apparatus in FIG. 3;

FIG. 6 is a sectional view taken along a line VI—VI in FIG. 5;

FIGS. 7 and 8 are views for explaining an operation of a portion corresponding to FIG. 6;

FIG. 9 is a sectional view of an in-phase control valve;

FIG. 10 is a sectional view of an antiphase control valve;

FIG. 11 is a graph showing the flow rate characteristics of an oil pump;

FIG. 12 is a graph showing the characteristics of control pressure to be applied to a variable throttle;

FIG. 13 is a view showing a schematic arrangement of the variable throttle;

FIG. 14 is a graph showing a relationship between the input pilot pressure and the output hydraulic pressure in the antiphase control valve;

FIG. 15 is a graph showing a relationship between in-phase and antiphase steering forces to be applied to a rear power cylinder;

FIG. 16 is a graph showing the turning angle characteristics of the rear wheels; and FIG. 17 is a graph showing the turning angle characteristics of the front wheels;

DETAILED DESCRIPTION OF THE PREFERRED EMBODIMENTS

Embodiments of the present invention will be described in detail with reference to the accompanying drawings.

FIGS. 1 to 17 show the first embodiment of the present invention. In this embodiment, a steering gear ratio changing apparatus of the present invention is applied to the front-wheel steering system of a four-wheel steering apparatus for controlling the turning angles of the front and rear wheels.

Figure 1:
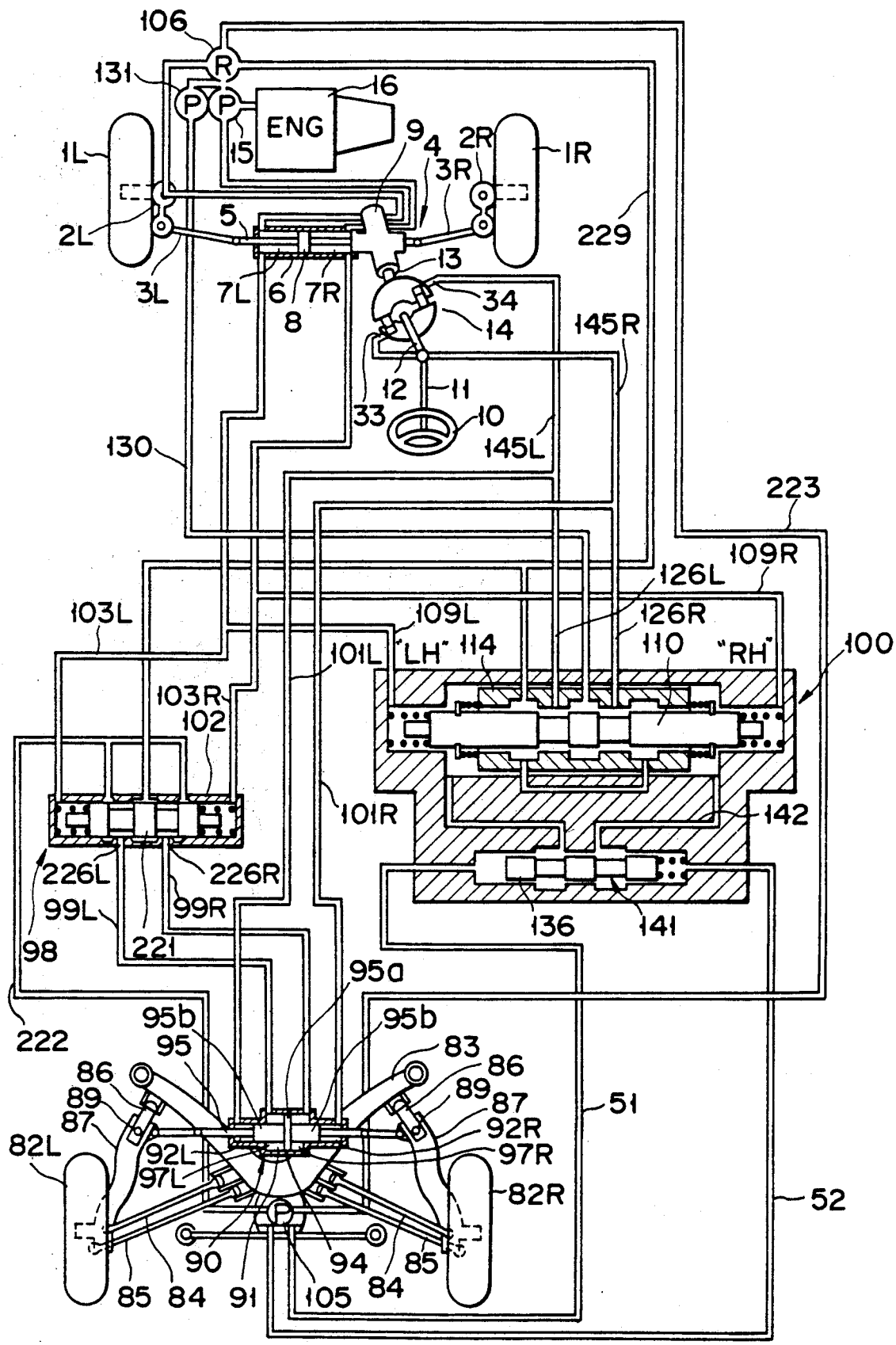
Figure 2:
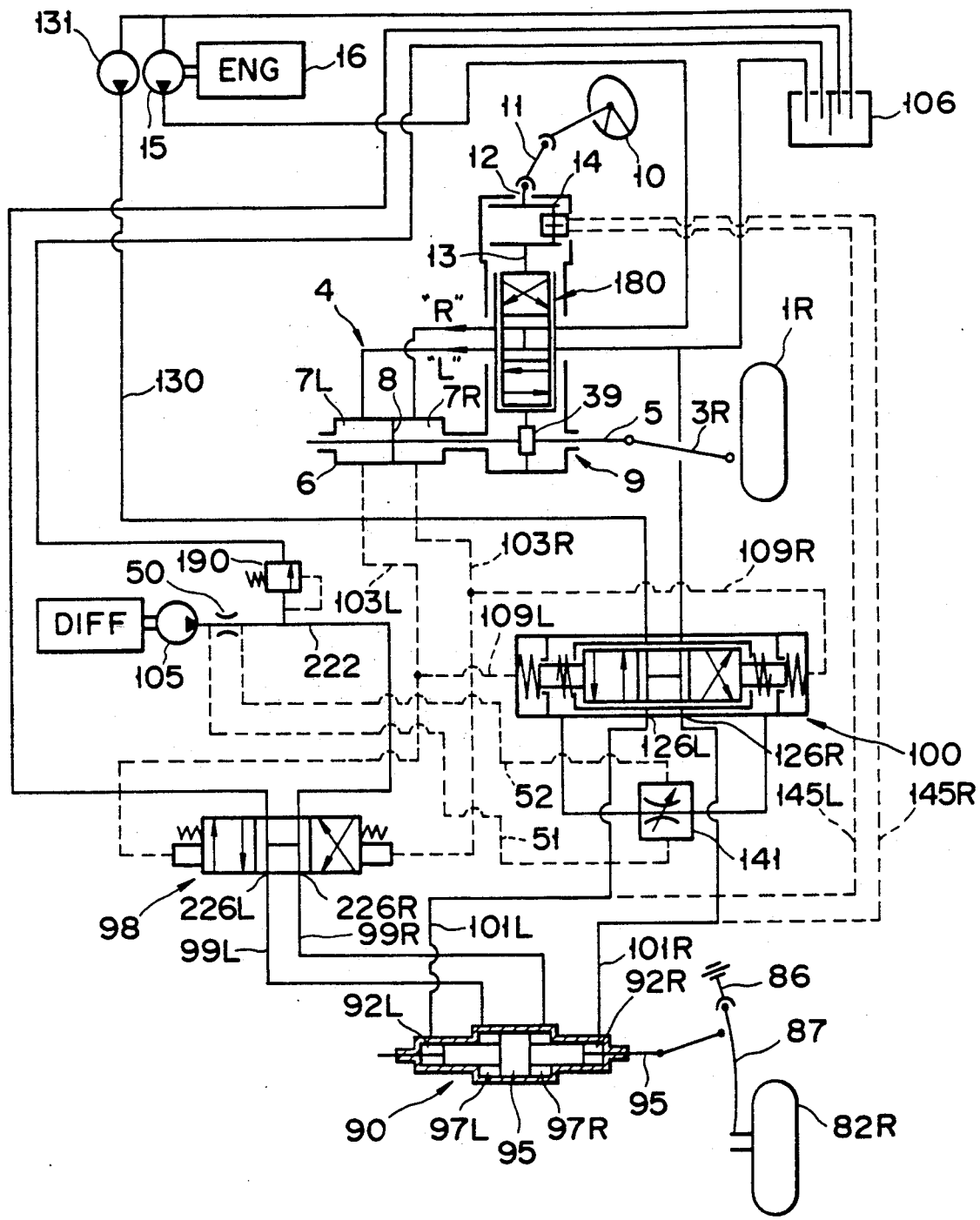

FIGS. 1 and 2 show a schematic arrangement of this four-wheel steering apparatus. Left and right front wheels 1L and 1R are rotatably supported by knuckles 2L and 2R. The knuckles 2L and 2R are respectively coupled to the left and right ends of a piston rod 5 of a power steering unit 4 through tie rods 3L and 3R. The piston rod 5 extends through a cylinder 6 and includes a piston 8 for partitioning the interior of the cylinder 6 into left and right pressure chambers 7L and 7R. In addition, the piston rod 5 includes a rack 40 meshed with a pinion 39 (FIG. 3) in a steering gear box 9. A gear ratio changing mechanism 14 is arranged between first and second steering shafts 12 and 13. The first steering shaft 12 receives a steering input from a steering wheel 10 through a column shaft 11. The second steering shaft 13 is coupled to the steering gear box 9. With this arrangement, a steering input from the steering wheel 10 is transmitted to the steering gear box 9 through the gear ratio changing mechanism 14. A known power steering valve 180 is arranged between the second steering shaft 13 and the pinion 39 so as to control supply of hydraulic pressures to the pressure chambers 7L and 7R of the cylinder 6. An oil pump 15 serves to supply hydraulic pressure to the power steering unit 4. The the oil pump 15 is driven by an engine 16 and whose delivery amount is decreased with an increase in engine speed, after the engine speed of the engine 16 exceeds a predetermined value.

The structures of the gear ratio changing mechanism 14 and the steering gear box 9 will be described in detail with reference to FIGS. 3 to 8.

Figure 6:
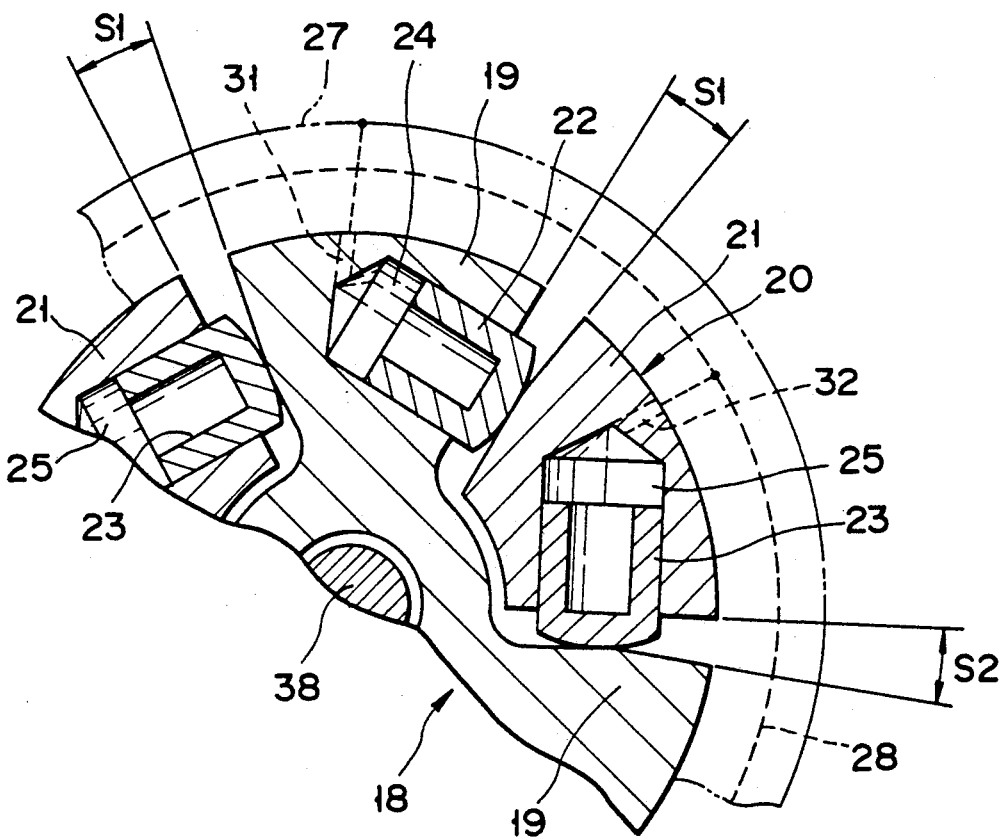

The changing mechanism 14 includes a substantially cylindrical casing 26, in which the first and second steering shafts 12 and 13 are rotatably and coaxially arranged. The lower end of the column shaft 11 shown in FIGS. 1 and 2 is coupled to a universal joint 17 shown in FIG. 3. The universal joint 17 is coupled to the upper end of the first steering shaft 12. A first annular rotor 18 is formed integrally with the lower end of the first steering shaft 12. As is apparent from the sectional views of FIGS. 4 and 6, three first pawls 19 axially extend from the lower end of the first rotor 18 so as to be offset from the axis of the shaft 12. The first pawls 19 are arranged at equal intervals in the circumferential direction of the rotor 18. An annular second rotor 20 is integrally formed with the upper end portion of the second steering shaft 13. As is apparent from the sectional views of FIGS. 4 and 6, three second pawls 21 axially extend from the upper end portion of the second rotor 20 so as to be offset from the axis of the shaft 13. The second pawls 21 are arranged at equal intervals in the circumferential direction of the rotor 20. The first and second rotors 18 and 20 are arranged such that the three first pawls 19 and the three second pawls 21 are meshed with each other in the circumferential direction. As shown in FIG. 6, a gap S1 is defined between the first pawl 19 and the second pawl 21 located on left side thereof, and a gap S2 is defined between the first pawl and the second pawl 21 located on the right side thereof. A first plunger 22 is provided at one side surface of each first pawl 19. The first plunger 22 protrudes from the pawl 19 by hydraulic pressure and abuts against a side surface of the corresponding second pawl 21 which opposes the side surface of the first pawl 19. A second plunger 23 is provided at one side surface of each second pawl 21. The second plunger 23 protrudes from the pawl 21 by hydraulic pressure and abuts against the side surface of the corresponding first pawl 19, on which no plunger is provided. In addition, a hydraulic chamber 24 for adjusting the protrusion amount of the first plunger 22 is formed in each first pawl 19. Similarly, a hydraulic chamber 25 for adjusting the protrusion amount of the second plunger 23 is formed in each second pawl 21. Note that the plungers 22 and 23 and the hydraulic chambers 24 and 25 constitute an actuator.

Figure 7:
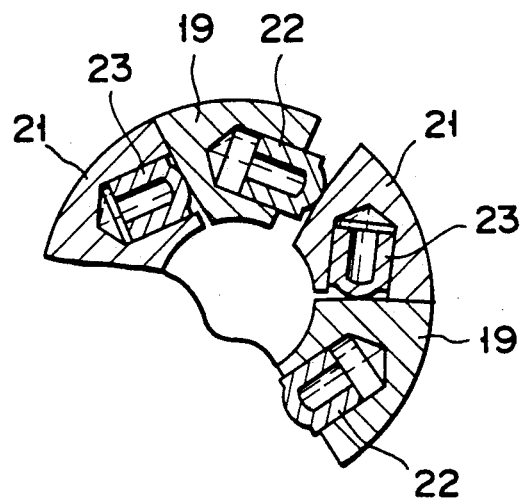
Figure 8:
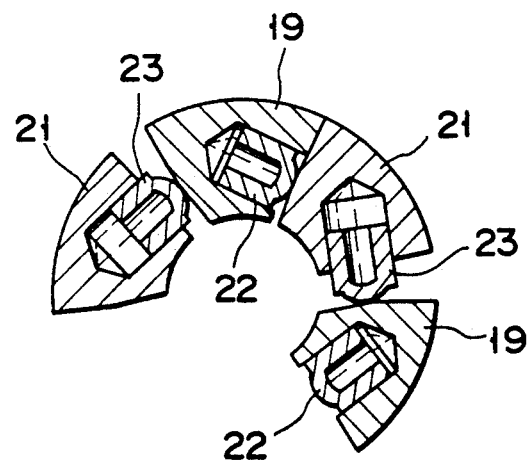

With this arrangement, when hydraulic pressure is introduced into the hydraulic chambers 24 so as to cause the first plungers 22 to protrude, each gap S2 is decreased, and each gap S1 is increased. As a result, the second rotor 20 is rotated in the clockwise direction in FIG. 6 relative to the first rotor 18, and a state shown in FIG. 7 is obtained. In contrast to this, when hydraulic pressure is introduced into the hydraulic chambers 25 so as to cause the second plungers 23 to protrude, each gap S1 is decreased, and each gap S2 is increased. As a result, the second rotor 20 is rotated in the counterclockwise direction in FIG. 6 relative to the first rotor 18, and a state shown in FIG. 8 is obtained. Note that if a phase shift described above occurs between the first and second rotors 18 and 20, an upper torsion bar 38a (to be described later) is forcibly twisted.

Figure 5:
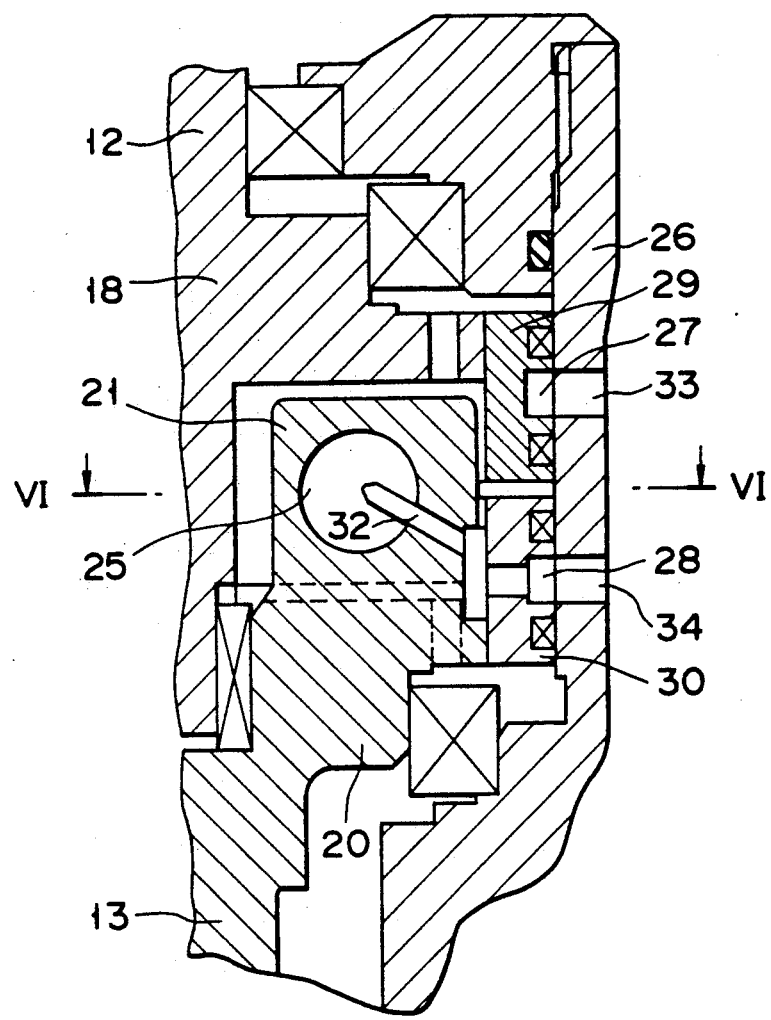

As shown in FIGS. 5 and 6, oil guide rings 29 and 30 are respectively fixed on the outer circumferences of the rotors 18 and 20 and define annular oil paths 27 and 28 between the inner surface of the casing 26 and the rotors 18 and 20. An oil path 31 is formed in each first pawl 19 to connect the hydraulic chamber 24 with the annular oil path 27. In addition, an oil path 32 is formed in each second pawl 21 to connect the hydraulic chamber 25 with the annular oil path 28. First and second ports 33 and 34 are formed in the casing 26 and respectively communicate with the annular oil paths 27 and 28.

Figure 3:
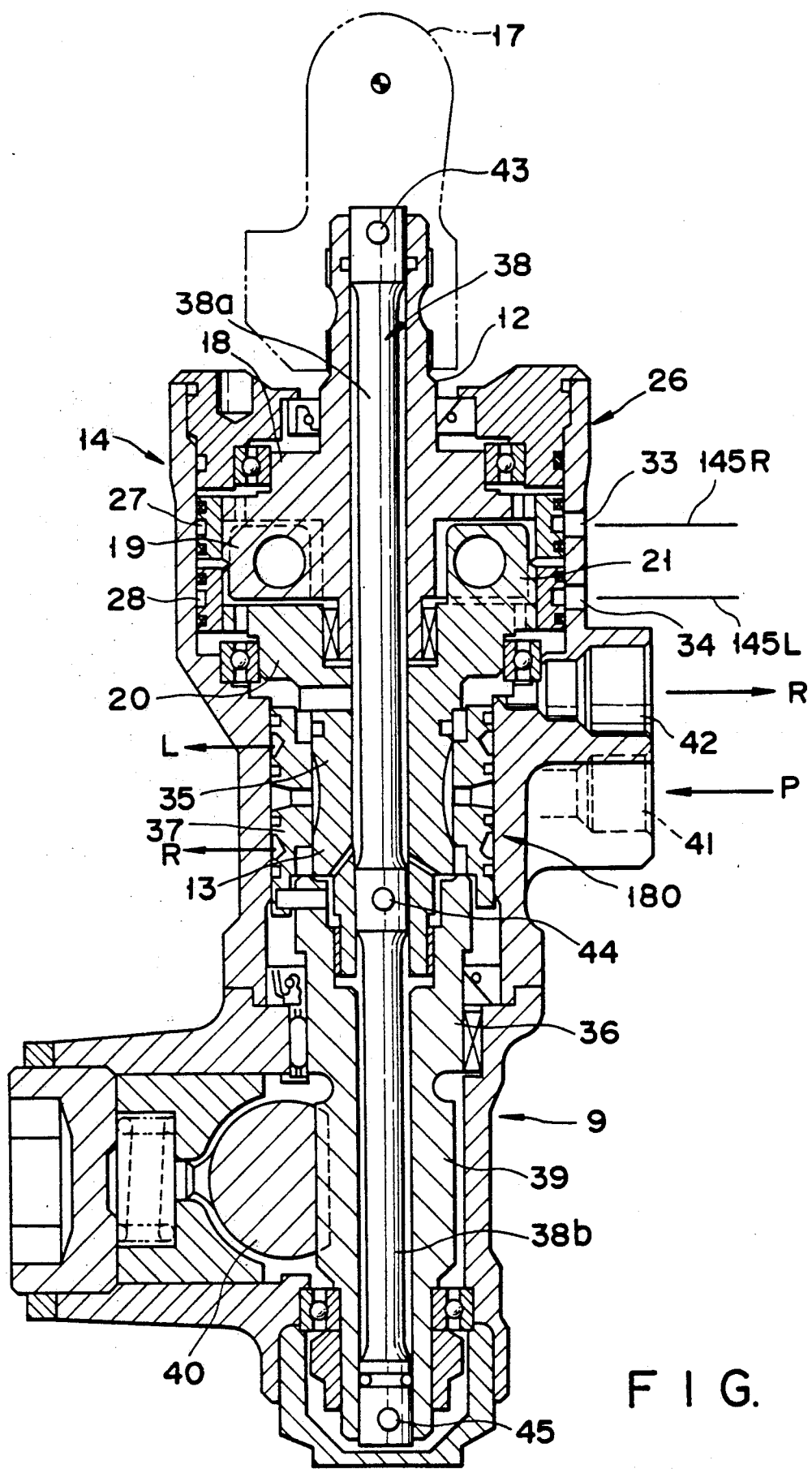
Figure 4:
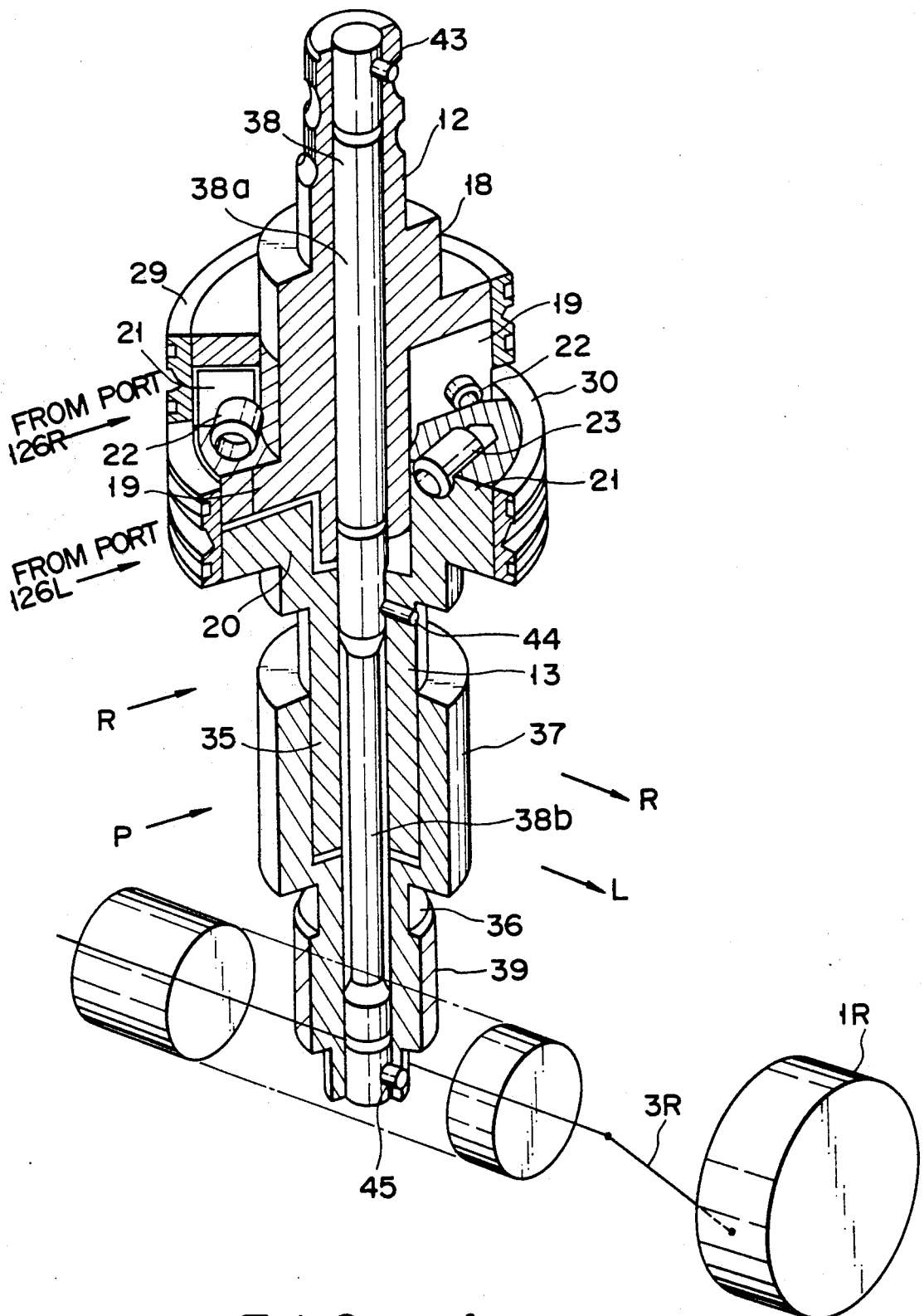

As shown in FIG. 3, the lower portion of the second steering shaft 13 constitutes an inner valve 35 of the power steering valve 180. The inner valve 35 controls an operation of the power steering unit 4 in cooperation with an outer valve 37 located outside the inner valve 35. The outer valve 37 is coupled to the upper end of a third steering shaft 36. The lower portion of the third steering shaft 36 is coupled to the piston rod 5 through a rack and pinion mechanism. The second and third power steering shafts 13 and 36 respectively correspond to the valve input and output shafts of a normal power steering unit. In other words, the shafts 12 and 13 respectively correspond to the upper and lower halves of a generally used input shaft.

The first, second, and third steering shafts 12, 13, and 36 are coupled to one another by pins 43, 44, and 45 through a two-step torsion bar 38 having an upper torsion bar 38a and a lower torsion bar 38b. This torsion bar 38 is designed such that the upper torsion bar 38a for coupling the steering shafts 12 and 13 has a rigidity level five to ten times that of the lower torsion bar 38b for coupling the steering shafts 13 and 36. Such an arrangement is employed to transmit a steering force input to the first steering shaft 12 to the second steering shaft 13 through the upper torsion bar 38a. A phase shift between the steering shafts 12 and 13 due to an operation of the gear ratio changing mechanism 14 is allowed by forcibly twisting the upper torsion bar 38a. The power steering unit 4 is designed to generate hydraulic pressure in accordance with the twist amount of the lower torsion bar 38b (a steering force to be input to the second steering shaft 13). Referring to FIG. 3, reference numeral 41 denotes an oil supply port for the power steering unit; and 42, an oil discharge port.

A rear-wheel steering system will be described with reference to FIGS. 1 and 2. Left and right rear wheels 82L and 82R are rotatably supported by the rear ends of trailing arms 87 of a double wishbone type rear-wheel suspension having a tow control mechanism. That is, with the rear-wheel suspension, two pairs of lateral arms each consisting of upper and lower arms 84 and 85, and tow control arms 86 are arranged on a cross member 83, while the front ends of each tow control arm 86 and the corresponding trailing arm 87 are coupled to each other through an intermediate joint, each pair of lateral arms and the rear end of the corresponding trailing arm 87 are coupled to each other through ball joints. Each of these intermediate joints includes a support shaft 89 such as a pin having a vertical rotational axis. With this arrangement, the rear wheels 82L and 82R can be steered upon displacement of the intermediate joints in the direction of the vehicle width.

The front ends of the trailing arms 87 are respectively coupled to the left and right output ends of a rear power cylinder 90 through left and right tie rods. The rear power cylinder 90 is mounted on the cross member 83. This cylinder 90 is of a duplex type, which includes a cylinder body 94 having a large-diameter cylinder chamber 91 formed in the middle of the cylinder and small-diameter cylinder chambers 92R and 92L formed on both sides of the cylinder chamber 91. A piston rod 95 is slidably arranged in the cylinder body 94. The piston rod 95 includes a piston portion 95a and position portions 95b located on both side of the portion 95a. The portion 95a has a diameter corresponding to the cylinder chamber 91, and the portions 95b have a diameter corresponding to the cylinder chambers 92R and 92L. The chamber 91 is partitioned by the piston portion 95a into left and right pressure chambers 97L and 97R for receiving hydraulic outputs for in-phase steering. Hydraulic pressures for antiphase steering act on the cylinder chambers 92R and 92L. The rear wheels 82L and 82R are turned upon displacement of the piston rod 95 in the widthwise direction of the vehicle. The left and right pressure chambers 97L and 97R are connected to an in-phase steering control valve 98 through oil paths 99L and 99R, respectively. The cylinder chambers 92R and 92L are connected to an auxiliary steering control valve 100 through oil paths 101L and 101R, respectively.

Figure 9:
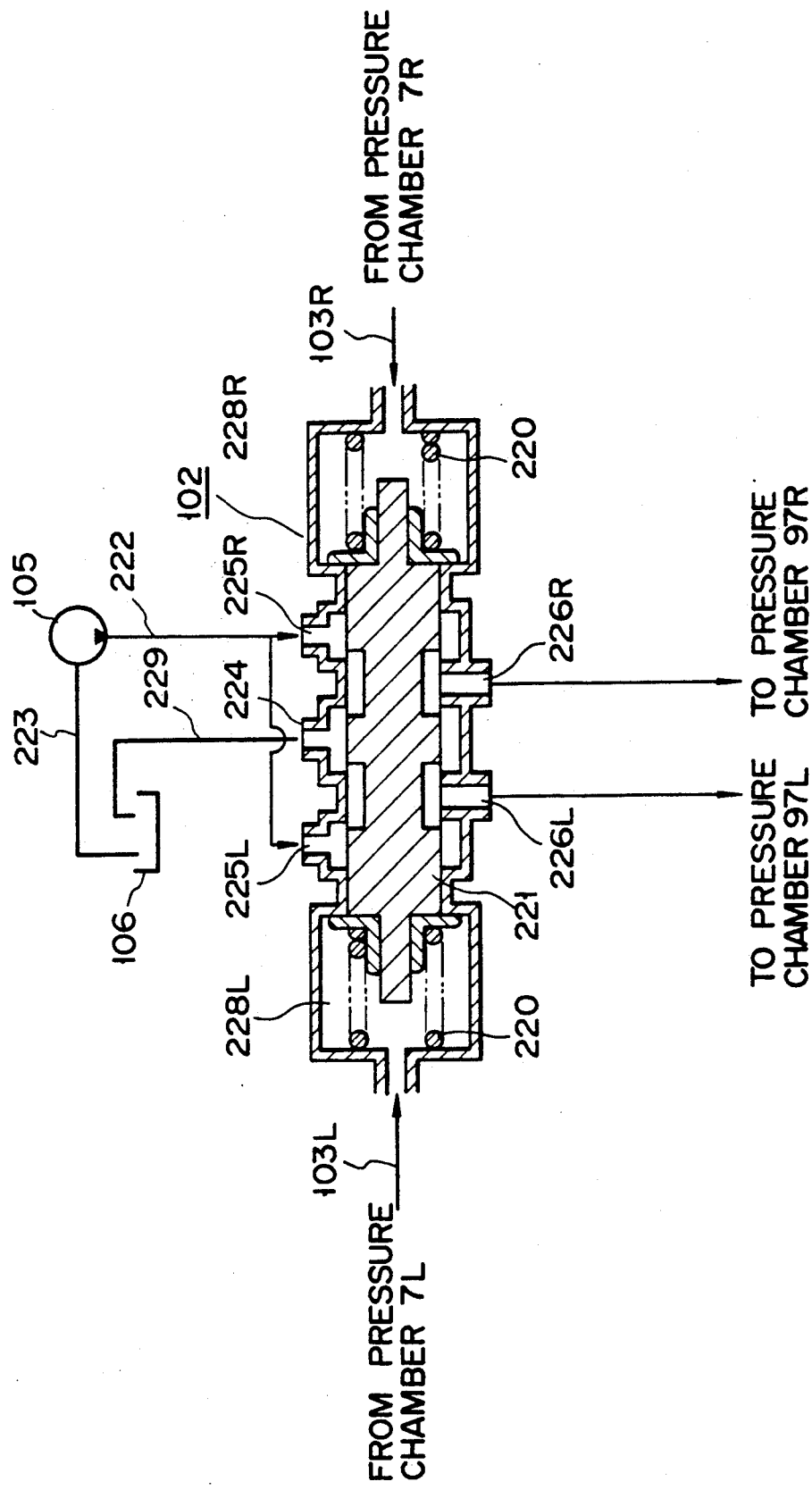

As shown in FIGS. 2 and 9, the in-phase steering control valve 98 is constituted by a spool valve of a throttle control type. More specifically, the valve 98 includes a cylindrical case 102 and a spool 221 arranged therein. Both ends of the spool 221 are biased by a pair of left and right springs 220 and held at a neutral position. The spool 221 has three land portions. The case 102 includes two inlet ports 225L and 225R to which a pressurized oil is supplied, a return port 224, located between the ports 225L and 225R, for discharging the pressurized oil, and left and right output ports 226L and 226R respectively located between the port 225L and the return port 224 and between the port 225R and the return port 224. The three land portions change communication and throttle amounts between the respective adjacent ports in accordance with the displacement of the spool 221, thereby controlling the pressure difference between the left and right output ports 226L and 226R. Left and right pilot pressure chambers 228L and 228R are formed on both sides of the spool 221 in the case 102. Pilot pressures for controlling the operation of the spool 221 are introduced into the pilot pressure chambers 228L and 228R. The pilot pressure chambers 228L and 228R respectively communicate with the left and right pressure chambers 7L and 7R of the power steering unit 4 through pilot oil paths 103L and 103R. The two inlet ports 225L and 225R are connected to the outlet of an oil pump 105 through an oil path 222. The oil pump 105 is driven by a ring gear in a differential unit for driving rear wheels. The oil pump 105 draws an oil in a reservoir tank 106 through an oil path 223 and delivers an amount of oil corresponding to a vehicle speed. Note that a relief valve 190 is arranged at the outlet of the oil pump 105 so as to adjust the delivery amount of the pump to be constant when the vehicle speed is higher than a predetermined value corresponding to a considerably high velocity range. The return port 224 is connected to the reservoir tank 106 through an oil path 229. The left and right output ports 226L and 226R are respectively connected to the left and right pressure chambers 97L and 97R of the rear power cylinder 90 through the oil paths 99L and 99R.

In the in-phase steering control valve 98 having the above-described arrangement, the displacement (throttle amount) of the spool 221 is controlled by hydraulic pressure generated by the power steering unit 4, and the amount of oil supplied to the value 98 is controlled in accordance with a vehicle speed. For this reason, the difference between the pressures in the left and right output ports 226L and 226R (in the pressure chamber 97L and 97R) is increased with an increase in hydraulic pressure (with an increase in a steering power) generated by the power steering unit 4 (steering power) and with an increase in vehicle velocity. The force in the in-phase steering direction generated by the rear power cylinder 90 is increased as this pressure difference is increased.

Figure 10:
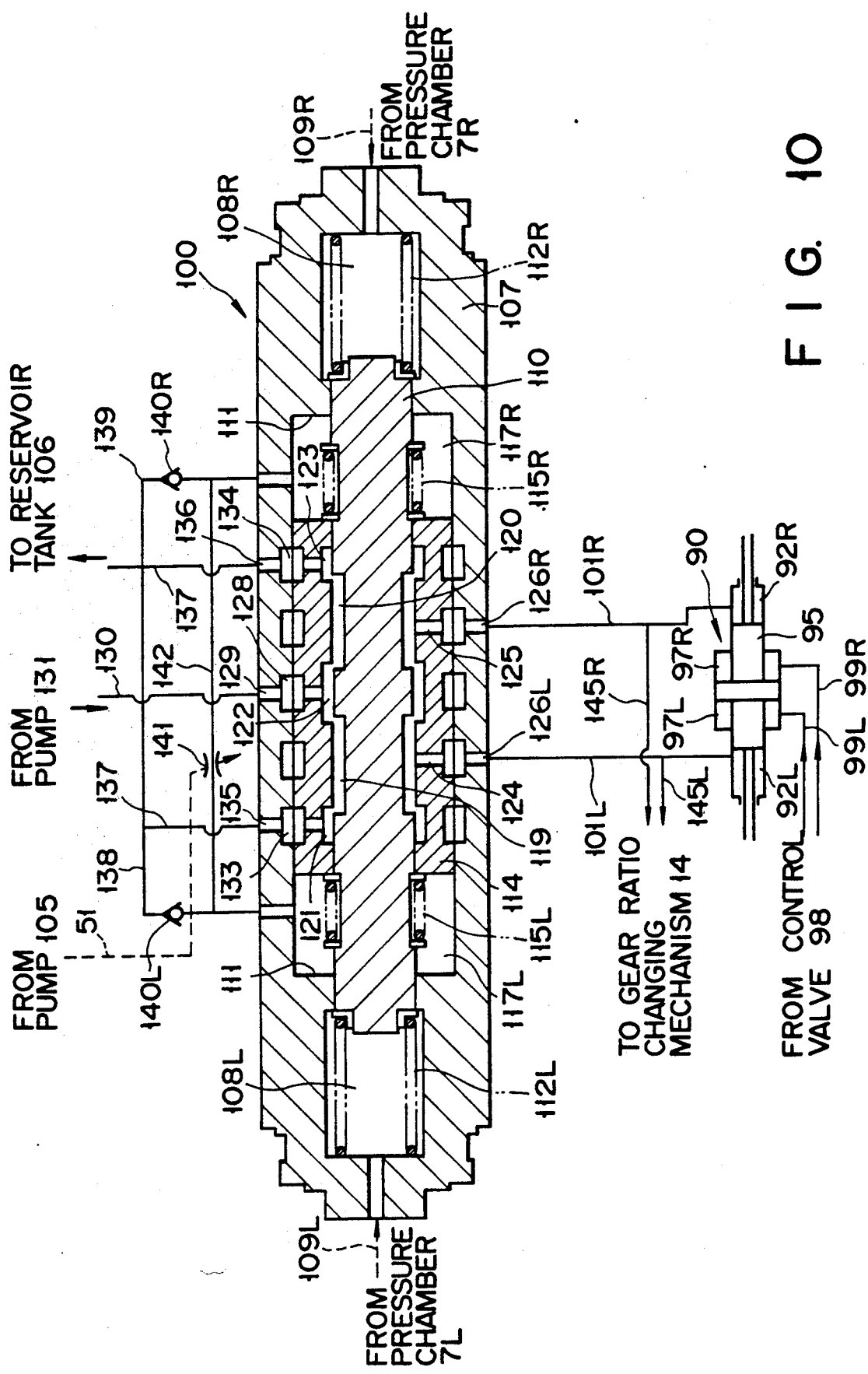

FIG. 10 shows a detailed structure of the auxiliary steering control valve 100. This control valve 100 is a four-port throttle switching valve of a spool valve type including a cylindrical case 107 and a spool 110 arranged therein and having three land portions. The outer surfaces of both end portions of the spool 110 are supported by bearing portions 111 formed in the inner surface of the case 107 so the the spool 110 is slidable in the axial direction of the case 107. A pair of springs 112L and 112R are respectively interposed between both ends of the spool 110 and both ends of the case 107 and bias the spool 110 to a neutral position. These springs 112L and 112R are housed in left and right pilot pressure introducing chambers 108L and 108R defined outside the bearing portions 111 of the case 107. The pilot pressure introducing chambers 108L and 108R are respectively connected through oil paths 109L and 109R to the intermediate intermediated portions of the oil paths 103L and 103R which communicate with the left and right pressure chambers 7L and 7R of the power steering unit 4.

The inner surface of the case 107 between the pair of bearing portions 111 is increased in diameter. A sleeve 114 having an outer diameter corresponding to this large-diameter portion is slidably fitted on the intermediate portion of the spool 110, which is located in the large-diameter portion. Both ends of the sleeve 114 are biased to a neutral position with respect to the spool 110 by a pair of springs 115L and 115R fixed to the spool 110. The spaces defined by the end portions of the sleeve 114 and the bearing portions 111 constitute pressure-receiving chambers 117L and 117R serving also as spring chambers.

Two chambers 119 and 120 defined by annular grooves between the two adjacent land portions are arranged side by side on the outer circumferential surface of the spool 110 covered with the sleeve 114. In addition, three chambers 121, 122, and 123 defined by annular grooves are formed on the inner circumferential surface of the sleeve 114 and located at the boundary portions of the chambers 119 and 120. Of these chambers, the chambers 119 and 120 respectively communicate with left and right output ports 126L and 126R bored in the case 107, through path spaces 124 and 125 defined between the sleeve 114 and the inner surface of the case 107. These output ports 126L and 126R are respectively connected to the cylinder chambers 92R and 92L of the rear power cylinder 90 through the oil paths 101L and 101R. The chamber 122 communicates with an inlet port 129 formed in the case 107 through a path space 128. The inlet port 129 is connected to the oil pump 15 and the outlet of a constant delivery amount type oil pump 131 driven by an engine 16 through an oil path 130. This oil pump 131 has delivery amount characteristics shown in FIG. 11 and supplies a constant amount of oil to the port 129.

The remaining chambers 121 and 123 respectively communicate with return ports 135 and 136 formed in the case 107, through path spaces 133 and 134 formed in the sleeve 114 and the inner surface of the case 107. These return ports 135 and 136 are connected in parallel with each other through oil paths 137 and are connected to the reservoir tank 106. The pressure-receiving chambers 117L and 117R on both sides of the sleeve 114 are connected in parallel with the oil paths 137 through oil paths 138 and 139. Check valves 140L and 140R for restricting the flow of an oil toward the reservoir tank 106 are arranged in the oil paths 138 and 139, respectively.

The portion of the oil path 138 between the check valve 140L and the pressure-receiving chamber 117L is connected to the portion of the oil path 139 between the check valve 140R and the pressure-receiving chamber 117R through a communicating path 142 for generating a differential pressure. A variable orifice 141 (or a variable choke) is provided in the path 142. The variable orifice 141 is actuated by hydraulic pressure obtained from the oil pump 105, which is driven by the differential unit, and having characteristics shown in FIG. 12, and its throttle amount is changed in accordance with a vehicle velocity. More specifically, the variable orifice 141 is designed to adjust the throttle amount of the communicating path 142 by controlling the overlap amount between a variable spool 136 and a casing 53, as shown in FIG. 13. The spool 136 is arranged in the communicating path 142 and is biased by a spring 49 in a direction to increase the throttle amount of the communicating path 142. The upstream and downstream side pressures of a throttle portion 50 arrange in the oil outlet path of the oil pump 105 are exerted, as a differential pressure, on both sides of the spool 136 through oil paths 51 and 52, thereby reducing the throttle amount of the orifice 141 with an increase in a vehicle speed.

According to the control valve 100 having the above-described arrangement, the spool 110 moves in accordance with hydraulic pressure generated by the power steering unit 4 and introduced into the pilot pressure chambers 108L and 108R. However, the pressure-receiving chambers 117L and 117R located on both sides of the sleeve 114 communicate with each other through the orifice 141. Therefore, when the displacing speed of the spool 110 is high, the sleeve 114 cannot immediately follow to the displacement of the spool 110 but responds with a delay. If a relative displacement is caused between the spool 110 and the sleeve 114 in this manner, hydraulic pressure corresponding to this relative displacement is output as a differential pressure, by the valve formed by the outer surface of the spool 110 and the inner surface of the sleeve 114, to the output ports 126L and 126R. That is, hydraulic pressure output from the control valve 100 is increased with an increase in relative displacement between the spool 110 and the sleeve 114. Therefore, the hydraulic pressure from the valve 100 is increased with an increase in changing rate of hydraulic pressure (generated by the power steering unit) which influences the displacing speed of the spool 110, and with a decrease in a vehicle velocity which controls the throttle amount of the variable orifice 141. The amount of throttle of the orifice 141 serves as resistance to the displacement of the sleeve 114. Hydraulic pressure output from the control valve 100 are supplied to the cylinder chambers 92R and 92L of the rear power cylinder 90 and act as power for turning the rear wheels in the antiphase direction relative to the front wheels. Note that the variable orifice 141 serves as a differential element. Therefore, even during a front-wheel steering operation, if there is no variation in hydraulic pressure generated by the power steering unit as in the case wherein the turning angle of the steering wheel is kept constant, the sleeve 114 is restored to the neutral position relative to the spool 110 by the springs 115L and 115R. Hence, the valve 100 generate no hydraulic pressure. For this reason, a hydraulic output from the control valve 100 is approximately controlled in accordance with the turning speed of the steering wheel.

The actuating direction and amount of the rear power cylinder 90 are controlled by a composite force of in-phase steering force exerted on the pressure chambers 97L and 97R from the in-phase steering control valve 98 and antiphase steering force exerted on the cylinder chambers 92R and 92L from the auxiliary steering control valve 100. That is, the rear wheels are turned in accordance with a composite value of two opposite inputs.

First and second ports 33 and 34 of the gear ratio changing mechanism 14 are respectively connected through oil paths 145R and 145L to the intermediate portions of the oil paths 101R and 101L which are connected to the output ports 126R and 126L of the control valve 100. Therefore, the hydraulic pressure output from the control valve 100 also acts on the gear ratio changing mechanism 14 in a direction to increase the turning angle of the front wheels. Accordingly, the control valve 100 synthetically controls antiphase steering of the rear wheels and phase advancing steering (increasing the turning angle) of the front wheels.

The operation of the four-wheel steering system having the above-described arrangement will be described.

As shown in FIGS. 1 to 3, when the steering wheel 10 is turned rightward from a forward travel state, a steering input from the steering wheel 10 is transmitted to the first steering shaft 12 through the column shaft 11 and is further transmitted to the second steering shaft 13 through the upper torsion bar 38a. The steering force input to the second steering shaft 13 tends to be transmitted to the third steering shaft 36 through the lower torsion bar 38b. However, since the torsional rigidity of the lower torsion bar 38b is small, the bar 38b is twisted to generate a phase difference between the inner and outer valves 35 and 37. As a result, a known power steering operation is performed. More specifically, hydraulic pressure output from the power steering valve 180 is exerted on the right pressure chamber 7R of the cylinder 6 and assists a right turning operation of the front wheels. In this state, the right pressure chamber 7R of the cylinder 6 is in a high pressure state, whereas the left pressure chamber 7L is in a low pressure state. These pressure states of the left and right pressure chambers 7L and 7R are respectively introduced, as pilot pressures, into the in-phase steering control valve 98 and the auxiliary steering control valve 100 through the oil paths 103L and 103R.

In the in-phase steering control valve 98, the pilot pressure chambers 228R and 228L are respectively set at high and low pressures, and the spool 221 is displaced to the left in FIG. 1 in accordance with the hydraulic pressure generated by the power steering unit. Therefore, hydraulic pressures, which are generated in accordance with the displacement of the spool 22 and the amount of oil supplied from the oil pump 105, set the output port 226L at high pressure and the output port 226R at low pressure, and these high and lower pressures are respectively exerted on the left and right pressure chambers 97L and 97R of the rear power cylinder 90 through the oil paths 99L and 99R. As a result, hydraulic pressure for turning the rear wheels rightward (in-phase direction) is exerted from the left pressure chamber 97L on the piston rod 95 of the rear power cylinder 90. This hydraulic pressure corresponds to the vehicle speed and hydraulic pressure generated by the power steering unit.

Figure 14:
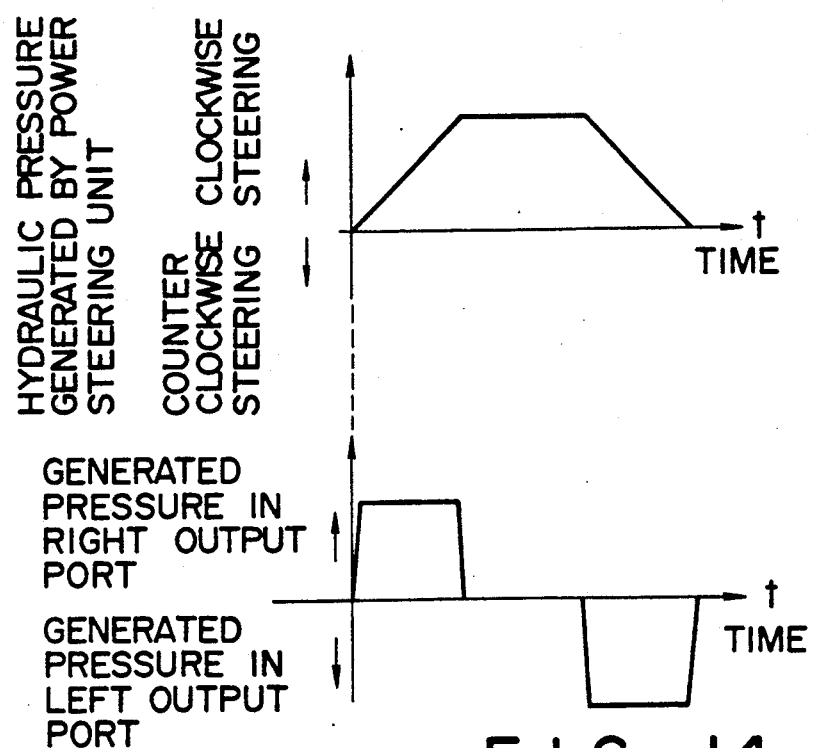

In the auxiliary steering control valve 100, the pilot chambers 108R and 108L are respectively set at high and lower pressures by hydraulic pressure generated by the power steering unit and introduced through the oil paths 109L and 109R. As a result, the spool 110 is displaced to the left in FIG. 1 in accordance with the hydraulic pressure generated by the power steering unit. The displacing rate of the spool 110 corresponds to the changing rate of the hydraulic pressure generated by the power steering unit. However, since the sleeve 114, which is biased to the neutral position on the spool 110 by the springs 115L and 115R, cannot directly follows to the displacement of the spool 110 because the pressure-receiving chambers 117L and 117R formed on both sides of the sleeve 114 are caused to communicate with each other through the throttle 141 and this throttle 141 serves as resistance to changes in volume of the chambers 117L and 117R. For this reason, only the spool 110 is greatly displaced to the left temporarily, causing a relative displacement between the spool 110 and the sleeve 114. However, the sleeve 114 is soon displaced following to the spool 110 by the spring force. This temporary relative displacement is increased as the displacing speed of the spool 110 (the change rate of the hydraulic pressure generated by the power steering unit is increased) is increased and as the throttle amount of the throttle 141 is increased (the vehicle velocity is decreased). In the state wherein the above-described relative displacement is caused, since the amount of oil supplied from the oil pump 131 is constant, hydraulic pressures corresponding to this relative displacement are mainly generated, and the output ports 126R and 126L of the valve 100 are respectively set at high and lower pressures. These pressures are exerted on the cylinder chambers 92R and 92L of the rear power cylinder 90 through the oil paths 101R and 101L, respectively. As a result, hydraulic pressure for turning the rear wheels leftward (in the antiphase direction) is exerted from the right chamber 92R on the piston rod 95 of the rear power cylinder 90. This hydraulic pressure is increased as the vehicle speed is decreased and the change rate of hydraulic pressure generated by the power steering unit is increased. Note that FIG. 14 shows the relationship between input pilot pressures and output hydraulic pressures in the control valve 100.

Figures 15, 16:
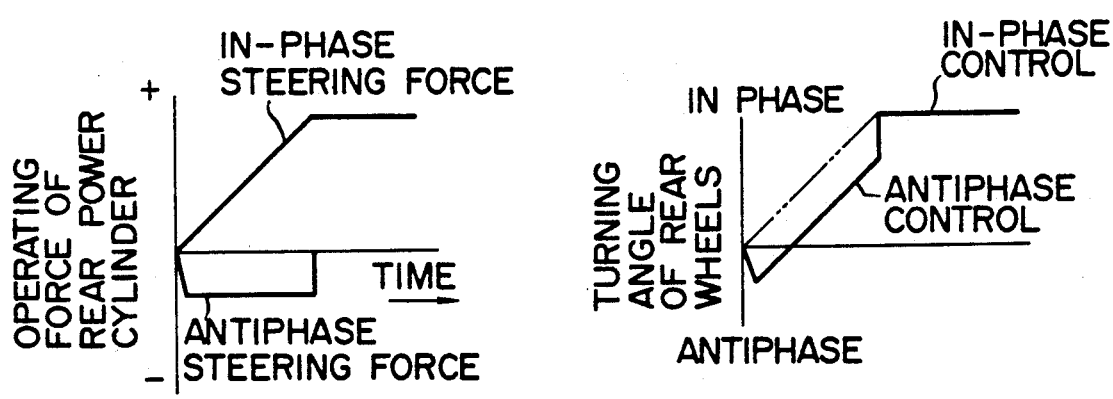

In the rear power cylinder 90, hydraulic pressure for turning the rear wheels rightward (in the in-phase direction), which acts on the pressure chamber 97L, and hydraulic pressure for turning the rear wheels leftward (in the antiphase direction), which acts on the cylinder chamber 92R, are exerted on the piston rod 95 in a counteracting manner. That is, the operation of the piston rod 95 is controlled by the composite force of both the hydraulic pressures. FIG. 15 shows the relationship between the in-phase steering force to be generated in accordance with hydraulic pressure generated by the power steering unit and the antiphase steering force to be generated in accordance with a change rate of the hydraulic pressure generated by the power steering unit. When the two steering forces are synthesized, a turning angle of the rear wheels exhibiting characteristics shown in FIG. 16 is obtained.

More specifically, when hydraulic pressure generated by the power steering unit is increased as in a case wherein the steering wheel is turned from a neutral state, the turning angle of the rear wheels in the in-phase direction, which is increased with an increase in the hydraulic pressure generated by the power steering unit, is decreased in accordance with the change rate of the hydraulic pressure. In practice, in an initial period in which the front wheels are turned, the rear wheels are turned in the in-phase direction after they are temporarily turned the antiphase direction. In addition, since the in-phase steering force is increased and the opposite-phase force is decreased as the vehicle speed is high, the antiphase steering amount in an initial steering period is decreased and the turning angle in the in-phase direction is increased. In contrast to this, during low-speed traveling, the in-phase steering force is decreased and the antiphase steering force is increased. Hence, the antiphase steering amount in an initial steering period is increased and the turning angle in the antiphase direction is decreased.

When the hydraulic pressure generated by the power steering unit does not change as in a case wherein the steering wheel is held in a stable state, the control valve 100 outputs no hydraulic pressure. Therefore, a turning angle of the rear wheels corresponding to the hydraulic pressure generated by the power steering unit can be obtained.

When hydraulic pressure generated by the power steering unit is decreased as in a case wherein the steering wheel is restored to the neutral position from a turned state, a hydraulic output from the control valve 100 is reversed. Therefore, the turning angle of the rear wheels in the in-phase direction, which is decreased with a decrease in hydraulic pressure generated by the power steering unit, is increased in accordance with the change rate of the hydraulic pressure generated by the power steering unit.

Figure 17:
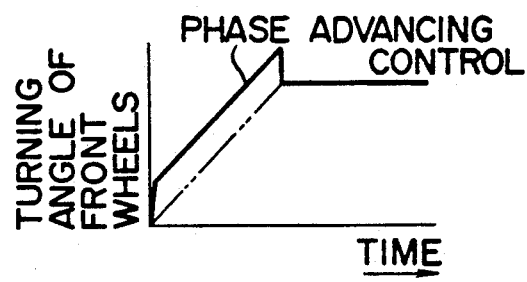

The hydraulic pressure output from the auxiliary steering control valve 100 acts on the rear power cylinder 90 in the above-described manner so as to correct the turning angle of the rear wheels in the antiphase direction, and also acts on the gear ratio changing mechanism 14 through the oil paths 145L and 145R. High hydraulic pressure, which is generated at the output port 126R of the control valve 100 when the steering wheel 10 is turned rightward, is introduced into the first port 33 of the changing mechanism 14 through the oil paths 101R and 145R, and is applied to the hydraulic chambers 24 in the first pawls 19 through the annular oil path 27 and the oil path 31. Since the hydraulic chambers 25 in the second pawls 21 communicate with the output port 126L of the control valve 100 through the oil paths 32 and 28, the second port 34, and the oil paths 145L and 101L, they are set in a low pressure state. As shown in FIG. 7, the first plungers 22 are caused to protrude y the hydraulic pressure applied to the hydraulic chambers 24 and push the second pawls 21 to rotate the second rotor 20. Thus, the upper torsion bar 38a is twisted and a relative displacement between the first and second rotors 18 and 20 is generated. Since the hydraulic chambers 25 are set in the low pressure state, the second plungers 23 are withdrawn into the second pawls 21. In this state, the width of the gaps S1 is increased and that of the gaps S2 is decreased, thus the second rotor 20 is rotated clockwise with respect to the first rotor 18. specifically, with respect to the first steering shaft 12 which is rotated clockwise by the input from the steering wheel the second steering shaft 13 is further rotated clockwise. Therefore, the second steering shaft 13 is rotated through an angle larger than the turning angle of the steering wheel 10. With this operation, the steering gear ratio is equivalently changed, performing phase advancing control in which the turning angle of the front wheels is increased in accordance with the change rate of hydraulic pressure generated by the power steering unit. Since the control valve 100 generates a hydraulic output only when the hydraulic pressure generated by the power steering unit changes, the above-described phase advancing control is performed when the steering wheel is turned, but this control is stopped when the steering wheel is held in a stable state, as shown in FIG. 17. When the hydraulic pressure generated by the power steering unit is decreased as in a case wherein the steering wheel is restored to the neutral position from a turned state, since the hydraulic output from the control valve 100 is reversed, the turning angle of the front wheels is decreased in accordance with the change rate of the hydraulic pressure generated by the power steering unit. With the gear ratio changing mechanism 14, even when an excessive input is exerted on the steering wheel 10 and breaks the upper torsion bar 38a, the first pawls 19 directly contact with the second pawls 21 and transmit the steering force of the steering wheel 10 to the second steering shaft 12.

According to the four-wheel steering system of the above-described embodiment, while in-phase steering of the rear wheels is controlled in accordance with hydraulic pressure generated by the power steering unit and substantially corresponding to the turning force of the steering wheel, the turning angle of the rear wheels is decreased and that of the front wheels is increased, in accordance with the change rate of the hydraulic pressure generated by the power steering unit, which rate is substantially corresponds to the turning speed of the steering wheel. With this construction, the yaw response and the lateral acceleration response of a vehicle can be improved, and hence both the steering response characteristics and steering stability can be satisfactorily improved. In addition, the slip angle of the center-of-gravity during a turning transient state approaches zero, thereby improving the turning feeling. Furthermore, since all the operations of the above-described four-wheel steering system are performed by hydraulic control, high reliability and durability can be ensured.

Especially, according to the steering gear ratio changing mechanism 14 of the above-described embodiment, the divided steering shafts 12 and 13 are engaged with each other with gaps set apart in the circumferential direction of the torsion bar, and the width of each gap is controlled by the plunger so as to equivalently change the steering gear ratio. Therefore, in comparison with the conventional changing apparatus using a planetary gear mechanism, a compact changing mechanism having a simple structure can be obtained.

Even if the torsion bar 38 is broken, since the steering shafts 12 and 13 are engaged with each other the steering input can be reliably transmitted to the steering gear box. As a result, a failsafe function can be ensured without any special arrangement.

Unlike the conventional steering gear ratio changing apparatus using the planetary gear mechanism, the backlash of the gears and the rotational resistance of the gears pose no problems. Thus, no play is produced, and the steering torque-oil pressure characteristics of the power steering unit exhibit no excessive hysteresis.

Figure 18:
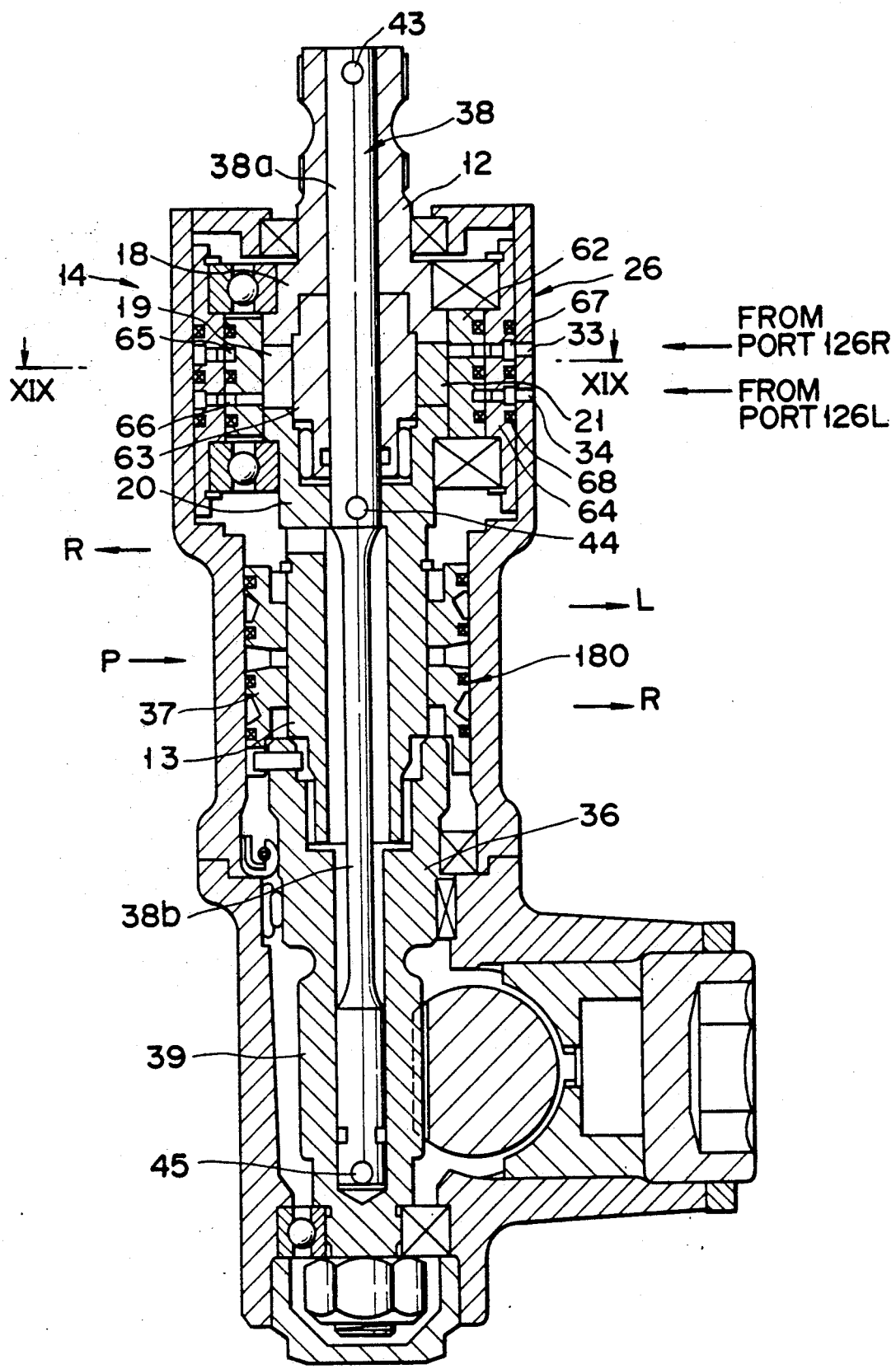
FIG. 18 is a sectional view of the steering gear ratio changing apparatus according to a second embodiment of the present invention.
Figure 19:
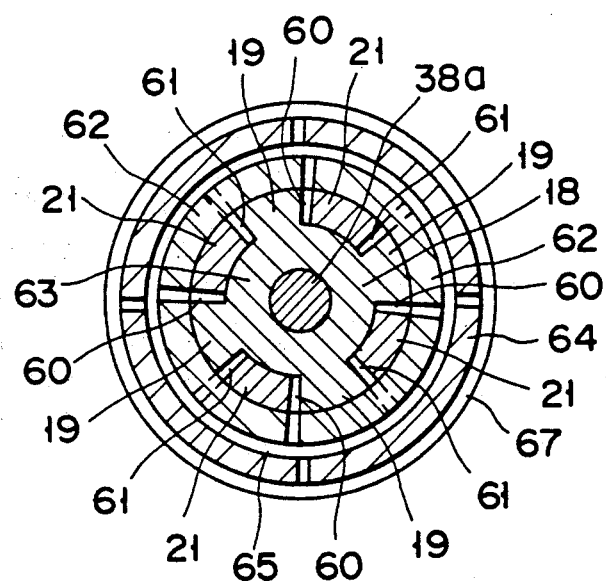
FIG. 19 is a sectional view taken along a line XIX—XIX in FIG. 18.

A second embodiment of the present invention will be described with reference to FIGS. 18 and 19. The same reference numerals in the second embodiment denote the same parts as in the first embodiment, and a detailed description thereof will be omitted.

According to the second embodiment, the plungers 22 and 23 in the first embodiment are omitted, and a hydraulic chamber 60 is defined between any first pawl 19 and one of the adjacent second pawls 21, and a hydraulic chamber 61 is defined between the first pawl and the other adjacent second pawl. Hydraulic pressure is applied to or released from these hydraulic chambers 60 and 61, thereby equivalently changing the steering gear ratio.

More specifically, four first pawls 19 are formed on the lower end of a first rotor 18 formed on a first steering shaft 12, and four second pawls 21 are formed on the upper end of a second rotor 20 arranged on a second steering shaft 13. These pawls 19 are arranged at equal intervals in the circumferential direction, axially protrude from the rotor 18, and are offset from the rotor axis. The second pawls 21 are arranged at equal intervals in the circumferential direction of the rotor 20, axially protude from the rotor 20, and are offset from the rotor axis. The first and second rotors 18 and 20 are located coaxially and face each other. The first and second pawls 19 and 20 are meshed with each other in the circumferential direction. As shown in FIG. 19, a pair of gaps are defined between any first pawl 19 and a pair of second pawls 21 located on both sides of the first pawls, and These spaces constitute the hydraulic chambers 60 and 61. An oil guide ring 62 is fixed to the outer circumference of the second rotor 20 and constitutes the outer walls of the hydraulic chambers 60 and 61. The inner walls of the hydraulic chambers 60 and 61 are constituted by a bosse 63 of the first rotor 18. Upper and lower annular oil paths 65 and 66 are defined between the oil guide ring 62 and an oil guide liner 64 fixed to the inner surface of a casing 26. The annular oil path 65 communicates with the hydraulic chambers 60, and oil path 66 communicates with the chambers 61. Upper and lower annular oil paths 67 and 68 are defined between the oil guide liner 64 and the casing 26. The annular oil path 67 communicates with a first port 33 formed in the casing 26 and the annular oil path 65. The annular oil path 68 communicates with a second port 34 formed in the casing 26 and the annular oil path 66. With this arrangement, the hydraulic chambers 60 and 61 normally communicate with the first and second ports 33 and 34, respectively. Similar to the description of the first embodiment, the operation of the changing apparatus will be described under a condition wherein hydraulic pressure from the control valve 100 is applied to the first port 33 while the steering wheel is turned clockwise. When high hydraulic pressure is introduced into the hydraulic chambers 60 through the annular oil paths 67 and 65, an upper torsion bar 38a is forcibly twisted, thus expanding to expand the hydraulic chambers 60 and contracting the hydraulic chambers 61. As a result, the second steering shaft 13 is rotated clockwise (FIG. 19) relative to the first steering shaft 12. With this operation, the second steering shaft 13 is rotated through an angle larger than that of the first steering shaft 12, i.e., the turning angle of the steering wheel. Therefore, similar to the first embodiment, the steering gear ratio is equivalently changed, and phase advancing control of the front wheels is performed.

According to the second embodiment, the same adventages as those in the first embodiment can be obtained. In addition, since the hydraulic chambers 60 and 61 are constituted by the spaces defined between the first and second steering shafts, and these hydraulic chambers 60 and 61 substantially function as actuators, the structure can be further simplified as compared with that of the first embodiment.

The present invention is not limited to the above-described embodiments. For example, the steering gear ratio changing apparatus of the present invention may be used independently of a four-wheel steering system. It is apparent that various changes and modifications can be made within the spirit and scope of the invention.

What is claimed is:

1. A steering gear ratio changing apparatus for changing a turning angle of vehicle wheels, which is generated in accordance with an angle of rotation of a steering wheel of a vehicle, said apparatus comprising:
a first steering shaft coupled to said steering wheel and rotatably integral with the steering wheel;
a second steering shaft interlocked and rotatable with an input shaft of a power steering device for assisting a turning operation of the vehicle wheels; and
a gear ratio changing mechanism connected between the first and second steering shafts;

said gear ratio changing mechanism including:
a first rotary member coupled to said first steering shaft and rotatably integral therewith,
a second rotary member coupled to said second steering shaft and engaging the first rotary member so that a first gap and a second gap set apart in the circumferential direction of the first steering shaft are defined between the first and second rotary members, wherein when one of said gaps increases, the other of said gaps decreases, and
actuator means for transmitting the rotation of the first rotary member to the second rotary member and for adjusting the width of the first and second gaps to cause a relative rotation between the first and second rotary members.

2. An apparatus according to claim 1, wherein said actuator means includes first plunger means, arranged on one of said first and second rotary members, for urging the other rotary member about its axis to cause a relative rotation between said first and second rotary members, and second plunger means, arranged on one of said first and second rotary members for urging one of said first and second rotary members in the circumferential direction of the rotary members to cause a relative rotation between said first and second rotary members in a direction opposite to said relative rotation caused by said first plunger means.

3. An apparatus according to claim 1, which further comprises control means for controlling an operation of said actuator means so as to increase a turning angle of the vehicle wheels turned by a power steering device, in accordance with a change rate of a turning state of said steering wheel.

4. An apparatus according to claim 3, wherein said control means comprises means for controlling said actuator means so as to increase a turning angle of the vehicle wheels in accordance with a change rate of hydraulic pressure generated by said power steering device.

5. An apparatus according to claim 3, wherein said control means comprises means for generating a hydraulic output for actuating said actuator means, the hydraulic output being decreased with an increase in travel speed of the vehicle, and said actuator means being adapted to cause said relative rotation to increase a turning angle of the vehicle wheels in accordance with the hydraulic output.

6. An apparatus according to claim 3, wherein said control means comprises: a constant delivery type oil pump; and a control valve including a first valve element arranged to be displaced upon reception of the hydraulic pressure generated by said power steering device as pilot pressure, a second valve element supported elastically with respect to said first valve element, said second valve element being displaced following the displacement of said first valve element, a pair of pressure chambers whose volumes vary in accordance with the displacement of said second valve element, a communicating path for causing said pair of pressure chambers to communicate with each other, and a variable throttle arranged in said communicating path and constructed so that the amount of throttle is decreased with an increase in travel speed of the vehicle, said control valve being adapted to receive an oil from said oil pump and to output the oil as hydraulic output according to a relative displacement between said first and second valve elements; and said actuator means being adapted to cause said relative rotation to change a turning angle of the vehicle wheels in accordance with the hydraulic output from said control valve.

7. An apparatus according to claim 1, wherein said actuator means comprises a first pressure chamber defined by one of said gaps, for causing relative rotation of said first and second rotary members in a first direction when a volume of said first pressure chamber is changed, a second pressure chamber defined by the gap different from said gap defining said first pressure chamber, for causing relative rotation of said first and second rotary members in a direction opposite to the first direction when a volume of said second pressure chamber is changed, and control means for supplying hydraulic pressure to said first and second pressure chambers to control the volumes of said pressure chambers.

8. An apparatus according to claim 2, wherein each of said first and second plunger means includes a pressure chamber formed in the rotary member on which said plunger means is arranged, and said actuator means includes means for applying hydraulic pressure to said pressure chamber to control an amount of protrusion of said plunger means.

9. A steering gear ratio changing apparatus for changing a turning angle of vehicle wheels, which is generated in accordance with an angle of rotation of a steering wheel of a vehicle, said apparatus comprising:
a first steering shaft coupled to said steering wheel and rotatably integral with the steering wheel, said first steering shaft having an axial end of which a disk-like first rotor is formed coaxially with the first steering shaft, and a first pawl protruding from the first rotor and being offset from the center of the first rotor;
a second steering shaft coupled to a steering gear mechanism and arranged substantially coaxially with said first steering shaft and adapted to rotate, said second steering shaft having an axial end, a disk-like second rotor formed on the axial end of the second steering shaft coaxially with the second steering shaft and opposing the first rotor, and a second pawl protruding from the second rotor toward the first rotor and being offset from the center of the second rotor;
a torsion bar for coupling said first and second steering shafts to each other so that said first and second pawls oppose each other while gaps set apart in the circumferential direction of the torsion bar are defined between the first and second pawls; and
actuator means for adjusting the width of the gaps to cause a relative rotation between the first and second steering shafts.

10. An apparatus according to claim 9, wherein said first steering shaft includes a plurality of first pawls arranged at equal intervals along the circumferential direction of said first steering shaft, and said second steering shaft includes a plurality of second pawls arranged at equal intervals along the circumferential direction of said second steering shaft, said first and second pawls being alternately engaged one another so that said gap is defined between two adjacent first and second pawls.

11. An apparatus according to claim 9, wherein said first and second steering shafts respectively have hollow portions, said torsion bar being inserted into the hollow portions of said steering shafts.

12. A steering gear ratio changing apparatus for changing a turning angle of vehicle wheels, which is generated in accordance with an angle of rotation of a steering wheel of a vehicle, said apparatus comprising:
- a first steering shaft coupled to said steering wheel and rotatably integral with the steering wheel;
- a second steering shaft coupled to a steering gear mechanism and arranged substantially coaxially with said first steering shaft and adapted to rotate;
- a torsion bar for coupling said first and second steering shafts to each other, said first and second steering shafts being held by the torsion bar so that gaps set apart in the circumferential direction of the torsion bar are defined between the first and second steering shafts; and
- actuator means for adjusting the width of the gaps to cause a relative rotation between the first and second steering shafts, said actuator means including first plunger means arranged on one of said first and second steering shafts, for urging the other steering shaft about its axis to cause a relative rotation between said first and second steering shafts, and second plunger means arranged on one of said first and second steering shafts, for urging one of said first and second steering shafts in the circumferential direction of the shafts to cause a relative rotation between said first and second steering shafts in a direction opposite to said relative rotation caused by said first plunger means.

13. An apparatus according to claim 12, wherein each of said first and second plunger means includes a pressure chamber formed in the steering shaft on which said plunger means is arranged, and said actuator means comprises means for applying hydraulic pressure to said pressure chamber to control a protrusion amount of said plunger means.

14. A steering gear ratio changing apparatus for changing a turning angle of vehicle wheels, which is generated in accordance with an angle of rotation of a steering wheel of a vehicle, said apparatus comprising:
- a first steering shaft coupled to said steering wheel and rotatably integral with the steering wheel;
- a second steering shaft coupled to a steering gear mechanism and arranged substantially coaxially with said first steering shaft and adapted to rotate;
- a first torsion bar for coupling said first and second steering shafts to each other, said first and second steering shafts being held by the first torsion bar so that gaps set apart in the circumferential direction of the first torsion bar are defined between the first and second steering shafts;
- actuator means for adjusting the width of the gaps to cause a relative rotation between the first and second steering shafts; and
- a control valve used for a power steering unit and arranged between said second steering shaft and said steering gear mechanism, said control valve including a second torsion bar coupled between said second steering shaft and said steering gear mechanism, wherein the rigidity of said first torsion bar is greater than that of said second torsion bar.

15. An apparatus according to claim 14, wherein said torsion bar and said second torsion bar are coaxially arranged and are integrally formed.

* * * * *